United States Patent [19]
Gerber

[11] Patent Number: 5,451,765
[45] Date of Patent: Sep. 19, 1995

[54] EYE SAFETY PROTECTION SYSTEM FOR A LASER TRANSMISSION SYSTEM WHEREIN LASER ENERGY SCATTERED BACK ALONG THE BEAM PATH IS DETECTED

[76] Inventor: Peter Gerber, Im Unterzelg 68, 8965 Berikon, Switzerland

[21] Appl. No.: 331,973

[22] Filed: Oct. 31, 1994

[51] Int. Cl.⁶ .............................................. G05D 25/02
[52] U.S. Cl. .................................... 250/205; 219/121.62
[58] Field of Search ........... 250/205, 551, 552, 214 D, 250/214 LA, 214 AL, 561, 216, 221, 222.1, 227.15, 227.14, 227.11; 372/9; 219/121.6, 121.61, 121.62; 356/73.1

[56] References Cited

U.S. PATENT DOCUMENTS

| | | | |
|---|---|---|---|
| 4,449,043 | 5/1984 | Husbands | 250/205 |
| 4,543,477 | 9/1985 | Doi et al. | 250/205 |
| 4,588,885 | 5/1986 | Lovoi et al. | 250/205 |
| 4,678,900 | 7/1987 | Nishioka | 250/205 |
| 4,687,918 | 8/1987 | Hughes et al. | 250/205 |
| 4,737,628 | 4/1988 | Lovoi | 250/205 |
| 4,876,444 | 10/1989 | Field | 250/214 AL |
| 4,960,988 | 10/1990 | Simms | 250/214 AL |
| 5,229,593 | 7/1993 | Cato | 250/205 |

*Primary Examiner*—David C. Nelms
*Assistant Examiner*—John R. Lee
*Attorney, Agent, or Firm*—John P. McGonagle

[57] ABSTRACT

An improved eye safety protection system for laser systems. The present invention measures energy returned along the optical axis itself. A beam splitter is installed in the optical axis and intercepts reflected energy back along the optical axis and passes the reflected energy to a photodetector which is used to measure the light scattered or reflected back along the emitting axis from the beam splitter. The output from the detector is passed to a comparator and regulation unit which adjusts the power level in the primary energy beam. Outgoing power can also be monitored.

6 Claims, 3 Drawing Sheets

EYE SAFETY PROTECTION SYSTEM FOR A LASER TRANSMISSION SYSTEM WHEREIN LASER ENERGY SCATTERED BACK ALONG THE BEAM PATH IS DETECTED

BACKGROUND OF THE INVENTION

This invention relates to protection systems for light responsive systems, and more particularly to a means for controlling the power emitted by a laser in order to insure eye safety.

The prior art has various shut-off protection systems for light responsive systems. One example may be found in U.S. Pat. No. 4,876,444 to B. F. Field which discloses a photodetector mounted on the laser transmission unit of a light guided vehicle. When a certain type light strikes the photodetector, the photodetector emits an electrical signal. This signal is used to override the laser control causing the vehicle to shut down. Another example may be found in U.S. Pat. No. 4,960,988 to R. A. Simms which discloses a safety shut-off protection system for light responsive systems. The light responsive system includes several, series-connected, normally-closed, light responsive photoelectric Darlington safety switches. These safety switches are located to receive light along with the light responsive systems. Light exceeding a threshold intensity impinging on any one of the Darlington safety switches causes such switches to deactivate the light sensitive system. Although effective for the specific purposes for which the patented devices are specifically disclosed, the above-named patented devices have serious limitations when applied to lasers where eye-safety is the goal.

It is possible in the above patented devices for obstructions (such as dirt, vignetting, etc.) to keep scattered light from striking the protection photodetectors yet not blocking the laser or light-sensitive element itself. The location of photodetectors, as in Simms, could be very dangerous for a laser safety system, because fingers or dirt could block the photodetectors yet allow the laser to strike an object (such as an eye) undetected.

Highly directional scattering or reflections can go undetected by the above prior art systems. If a laser beam strikes a plane mirror at normal incidence, the beam is directed back onto itself. This retroreflection would go undetected by the prior art devices.

SUMMARY OF THE INVENTION

In view of the foregoing disadvantages inherent in the known types of devices now present in the prior art, the present invention provides an improved eye safety protection system for laser systems. As such, the general purpose of the present invention, which will be described subsequently in greater detail, is to provide a system to control the power emitted by a laser in order to insure eye safety. A photodetector is used to measure the light scattered or reflected back along the emitting axis from a beam splitter. This device has sufficient sensitivity to insure that the laser will turn off (or be switched to Laser Class 1—completely eye safe) when any object, including a human eye, is in the path of the laser.

To attain this, the present invention measures light returned along the optical axis itself. A beam splitter is used and installed in the optical axis. Because a beam splitter is used, it is possible to measure the light along the axis of the component itself. Since a beam splitter is used in the invention, outgoing power may also be measured. This is an important feature for current controlled diode lasers in terms of eye safety. A built-in monitor photodiode is provided which gives a precise measure of the optical power emitted by the laser. This measured optical power is used in a feedback circuit and allows for automatic power compensation, that is, the laser is driven so that the desired power is emitted. This ensures that the extra amount of power is emitted by the laser and ensures that the designated laser class specifications are never exceeded. By properly using the monitor photodiode, correctly used continuous wave (CW) or pulsed lasers can be insured to fall in the proper laser class at all times.

The instant invention is different from the above-named patented prior devices in three principal ways. Simms explicitly uses the system to protect light-sensitive components (cameras, imagers, etc) from overexposure by external light sources, whereas the present system is controlling a light-producing component (laser, light emitting diode, etc.) in order to protect illuminated objects (specifically, the human eye and body). Both prior art devices explicitly turn off the light responsive system, whereas the instant invention can be used to not only turn off the component, but to rather switch the laser from a high laser Class to Class 1. Both prior art devices clearly claim cases where light is measured by photodetectors located along side or at a separate location from the optical axis of the light-sensitive component. The instant invention measures light returned along the optical axis itself. A beam splitter is used and the projected axis is coincident with the optical axis of the laser, itself.

Use of a beam splitter has many advantages. The instant invention laser and photodetector share a housing and aperture, so that anything which blocks the photodetector path necessarily also blocks the outgoing laser. Retroreflection which would go undetected by prior art devices would be detected by the instant invention. As stated above, outgoing power can be measured as well as incoming light.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
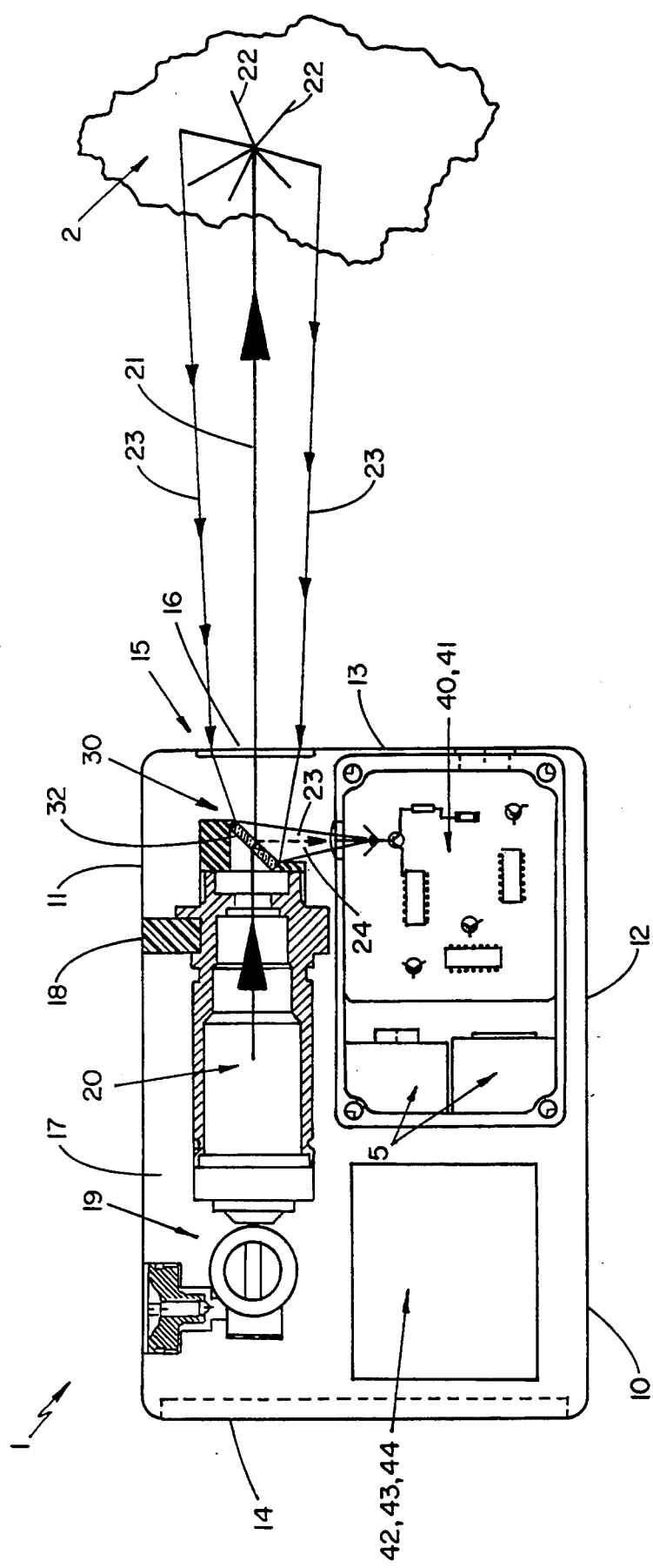
FIG. 1 is a cross-sectional view showing the general construction of a laser emitting device with the instant invention eye safety protection system.
Figure 2:
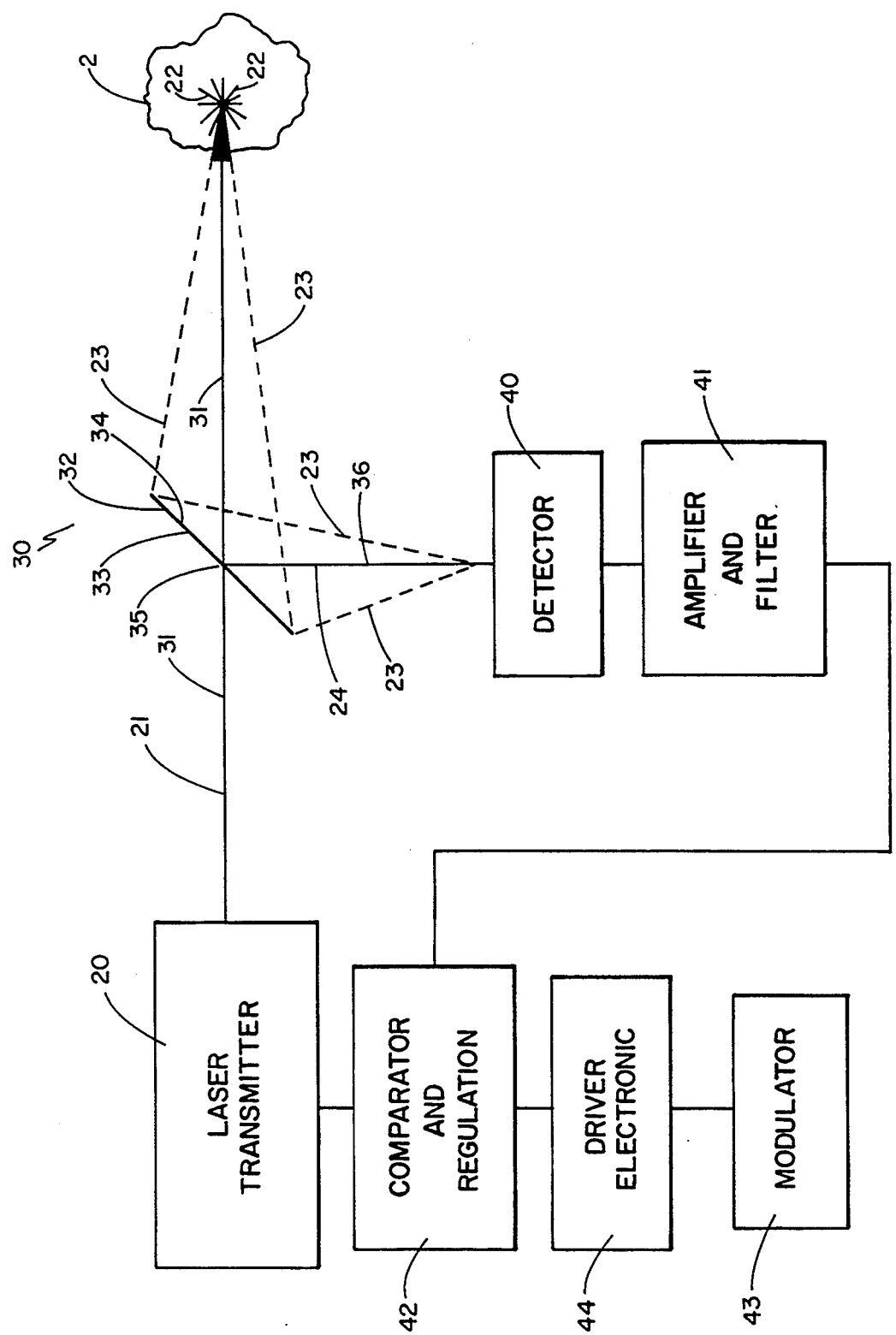
FIG. 2 is a block diagram showing an example of the invention.
Figure 3:
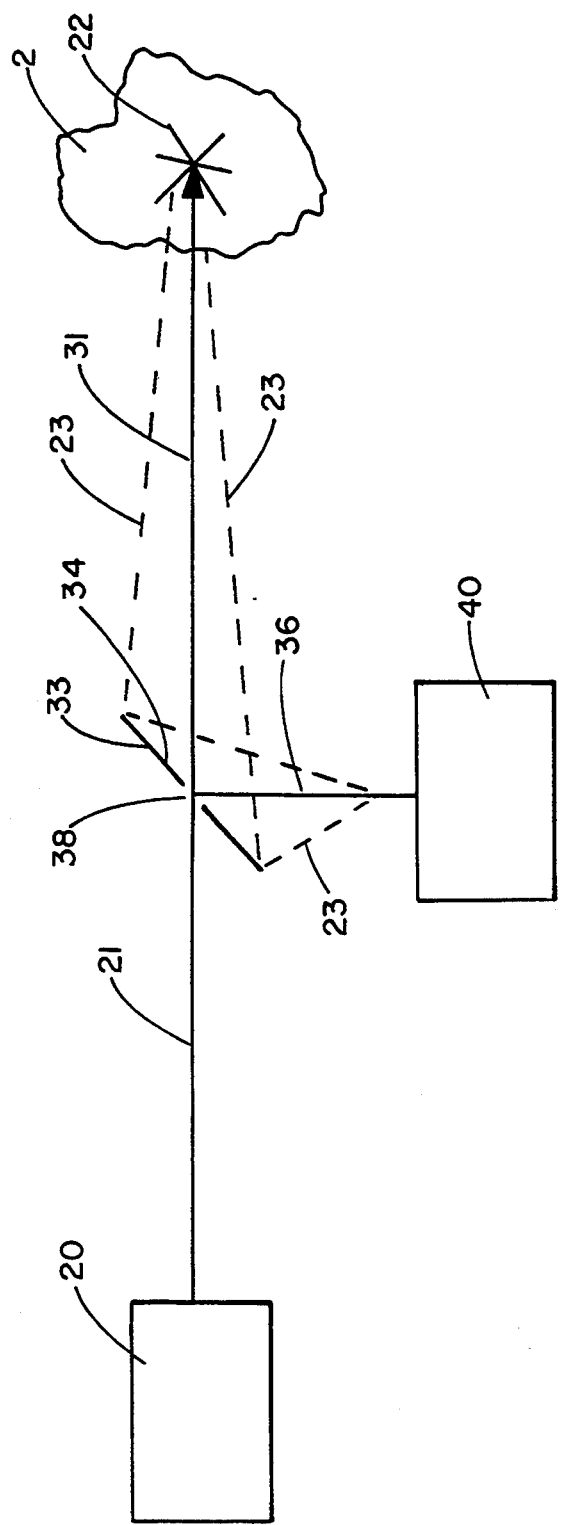
FIG. 3 is a partial block diagram showing an alternate example of the invention.

Referring to the drawings in detail wherein like elements are indicated by like numerals, there is shown an embodiment of the invention 1 incorporating an eye safety protection system. A laser beam 20 is emitted by and from a laser transmission unit 20 located within a generally rectangular housing 10. Although the housing 10 in this embodiment is rectangular, the housing 10 may have any desired shape. The housing 10 has a top 11, bottom 12, a forward end 13 and a rear end 14. For reference purposes, the top 11 and bottom 12 will be considered in horizontal planes and the forward and rear ends 13, 14 in vertical planes. The forward end 13 has an upper opening 15 with an optical element 16 covering the opening 15. In this embodiment of the invention, the optical element 16 is made from planed glass. The housing rear end 14 is enclosed. The laser transmission unit 20 is located centrally in an upper interior portion 17. The laser transmission unit 20 has a generally cylindrical shape and a longitudinal axis parallel with the housing top 11. The central longitudinal axis of the laser transmission unit 20 protrudes through the optical element 16 in the front housing opening 15 forming an optical path for projection of a laser beam 21 from the laser transmission unit 20. The central, longitudinal axis of the laser transmission unit 20 extending through the housing forward end opening 15 is defined as the laser beam optical axis 31. In the preferred embodiment, a CW laser transmission unit is used, having a basic frequency band width in the infrared or visible light range. In alternate embodiments, a pulsed laser transmission unit may be used.

A beam splitter 30 is positioned between the laser transmission unit 20 and the housing forward end opening 15 in the optical axis path 31. The beam splitter can be an optic with a hole or a short flat surface. The beam splitter 30 in this embodiment of the invention is comprised of a mirror 32 positioned at a 45 degree angle to the optical path 31. However, the mirror 32 may be positioned at any other desired angle. The mirror 32 has an inner surface 33 and an outer surface 34. The inner surface 33 is defined as that surface generally facing the laser transmission unit 20. The outer surface 34 is defined as that surface generally facing the housing forward end opening 15. The mirror 32 is designed to reflect a certain amount of the energy incident on it and to be transparent to the remaining the energy incident to it. The desired amount of energy reflected may be anywhere from 1 to 99% of the energy incident to it. The reflected-transparent ratio of the invention 1 may be changed depending upon which side 33, 34 of the mirror 32 is receiving the energy. This may be done with various optical coatings and/or angles (wave lengths) to determine the incident light reflected-transparent ratio. The laser beam optical axis 31 passes through the central portion 35 of the mirror 32. In this embodiment of the invention the laser beam 21 generated by the laser transmission unit 20 proceeds along the optical path 31 through the mirror central portion 35, through the housing front optical element 16 to an object 2. Upon striking the object 2 a certain amount of the energy from the laser beam 21 is scattered. The scattered energy 22 bounces off the object 2 in every direction. Some of the scattered energy 22 is reflected back, i.e., reflected energy 23, along the laser beam optical axis 31 toward the laser transmission unit 20 within the housing 10. The reflected energy 23 strikes the mirror outer surface 34 and is directed along a beam-splitted reflected optical path 36 to a detector 40. In this embodiment of the invention the beam-splitted reflected optical path 36 is at right angles to the laser beam optical axis 31. The reflected energy 23 is reflected from the beam splitter mirror outer surface 34 to a detector 40 located directly below the beam splitter 30 within the housing 10. The detector 40 is a photoelectric device which converts the reflected laser beam energy 23 from the beam splitter 30 to a voltage output. The detector voltage output is passed to an amplifier and filter unit 41 for treatment. The treated reflected energy voltage is outputted from the amplifier and filter unit 41 and fed to a comparator and regulation unit 42. The purpose of the comparator 42 is to compare the original laser beam frequency with the frequency of the reflected beam to determine whether the reflected energy is the "right" reflected energy, i.e., a reflection of the actual original laser beam 21. A modulator 43 determines the frequency of the laser beam 21 and passes this frequency through driver electronics 44 to the comparator and regulation unit 42 which in turn controls both the frequency of the laser beam and its amplitude, i.e., power. If the reflected energy 23 power is relatively large, the regulation circuitry (not shown) in the comparator and regulation unit 42 will reduce the power of the laser beam 21. If the reflected energy 23 power is relatively low, the regulation circuitry in the comparator and regulation unit 42 will increase the power of the laser beam 21.

In an alternate embodiment of the invention 1 the beam splitter mirror inner surface 33 directly intercepts a portion of the laser beam 21 from the laser emitter 20. The intercepted portion 24 of the laser beam 21 is refracted through the beam splitter mirror central portion 35 and directed to the detector 40. The detector 40 converts the refracted laser beam energy 24 from the beam splitter 30 to a voltage output. The detector voltage output is passed to an amplifier and filter unit 41 for treatment. The treated reflected energy voltage is outputted from the amplifier and filter unit 41 and fed to the comparator and regulation unit 42. If the refracted energy 24 power exceeds a desired level, the regulation circuitry (not shown) in the comparator and regulation unit 42 will reduce the power of the laser beam 21. If the refracted energy 24 power is below a desired level, the regulation circuitry in the comparator and regulation unit 42 will increase the power of the laser beam 21. This makes the invention 1 a self-regulating system.

As may be seen from FIG. 1 in an actual embodiment of the invention a position pin 18 may be included within the housing 10 to hold and position the laser transmitter unit 20 in general alignment with the front opening 15. It may also be desirable to install an X and Y adjustment capability 19 for fine alignment. The invention 1 could be a self-contained unit with electrical power provided by batteries 5.

In another embodiment of the invention, the central portion 35 of the mirror 32 could be an actual open aperture 38 through which the primary laser energy beam 21 passes along the optical path 31. The reflected energy 23 would still be returned back along the optical path 31 wherein the mirror outer surface 34 would reflect the reflected energy 23 to the detector unit 40.

It is understood that the above-described embodiment is merely illustrative of the application. Other embodiments may be readily devised by those skilled in the art which will embody the principles of the invention and fall within the spirit and scope thereof.

I claim:

1. An eye safety protection system for a laser transmission system, said system comprising:

a housing having a top, bottom, a forward end with an opening and an enclosed rear end;

an optical element covering said opening;

laser transmission unit located within said housing, wherein said laser transmission unit has a longitudinal axis parallel with the housing top;

a laser beam optical path defined as the central, longitudinal axis of the laser transmission unit extending from said unit and protruding through the housing forward end opening optical element for projection of a laser beam from said laser transmission unit to an object, wherein the laser beam generated by the laser transmission unit proceeds along the optical path through the housing front optical element to said object, striking the object, wherein a portion of the energy from said laser beam is scattered, some of said scattered energy bouncing off said object back along the laser beam optical axis toward the laser transmission unit within the housing;

a beam splitter positioned between the laser transmission unit and the housing forward end opening in the laser beam optical path, said beam splitter being comprised of a mirror positioned at an angle to the optical path, said mirror having a central portion through which the laser beam optical axis passes, an inner surface defined as that surface generally facing the laser transmission unit and an outer surface defined as that surface generally facing the housing forward end opening, wherein said mirror outer surface is adapted to reflect a portion of the scattered energy incident on it;

a detector for receiving the reflected scattered energy from said beam splitter mirror outer surface, said detector being a photoelectric device which converts the reflected scattered energy to a voltage output signal;

an amplifier and filter unit electrically connected to said detector for receiving and treating said voltage output signal; and a comparator and regulation unit electrically connected to said amplifier and filter unit for receiving said treated voltage output signal and electrically connected to said laser transmission unit for controlling the amount of power in said laser beam, wherein said treated signal is compared to the original laser beam frequency to determine whether the reflected scattered energy has the same frequency as the laser beam, and the amplitude of said treated signal is compared with preset levels for increasing or lowering the amount of power in said laser beam.

2. A system as recited in claim 1, wherein:
said beam splitter mirror inner surface directly intercepts a portion of the laser beam from the laser emitter refracting the intercepted portion of the laser beam to said detector.

3. A system as recited in claim 2, wherein:
the optical element is made from planed glass.

4. A system as recited in claim 3, wherein:
said laser transmission unit contains a continuous wave laser generator.

5. A system as recited in claim 4, wherein:
said housing has a generally rectangular shape.

6. A system as recited in claim 1, wherein:
said mirror central portion contains an open aperture through which the laser beam passes along the optical path.

* * * * *